United States Patent
Albers et al.

(10) Patent No.: US 12,490,748 B2
(45) Date of Patent: Dec. 9, 2025

(54) SPINE PROCESSING DEVICE

(71) Applicant: MAREL RED MEAT B.V., Lichtenvoorde (NL)

(72) Inventors: Bastiaan Martinus Cornelis Albers, Lichtenvoorde (NL); Niels Antonio William Koster, Lichtenvoorde (NL); Jan Johannes Meerdink, Lichtenvoorde (NL); Robert David Van Riet, Lichtenvoorde (NL); Franciscus Theodorus Henricus Johannes Van Der Steen, Lichtenvoorde (NL); Leonardus Jozephus Antonius Tiggeloven, Lichtenvoorde (NL)

(73) Assignee: MAREL RED MEAT B.V., Lichtenvoorde (NL)

( * ) Notice: Subject to any disclaimer, the term of this patent is extended or adjusted under 35 U.S.C. 154(b) by 0 days.

(21) Appl. No.: 18/861,052

(22) PCT Filed: May 11, 2023

(86) PCT No.: PCT/EP2023/062582
§ 371 (c)(1),
(2) Date: Oct. 28, 2024

(87) PCT Pub. No.: WO2023/217953
PCT Pub. Date: Nov. 16, 2023

(65) Prior Publication Data
US 2025/0287961 A1   Sep. 18, 2025

(30) Foreign Application Priority Data
May 12, 2022 (EP) .................................. 22173094

(51) Int. Cl.
*A22C 17/00* (2006.01)
*A22C 17/02* (2006.01)

(52) U.S. Cl.
CPC ............ *A22C 17/004* (2013.01); *A22C 17/02* (2013.01)

(58) Field of Classification Search
CPC ... A22C 17/004; A22C 17/02; A22C 17/0046; A22B 5/0017; A22B 5/0029; A22B 5/0035
See application file for complete search history.

(56) References Cited

U.S. PATENT DOCUMENTS

| 4,716,626 A | 1/1988 | Chiron et al. |
|---|---|---|
| 5,611,727 A | 3/1997 | Dufour et al. |

(Continued)

FOREIGN PATENT DOCUMENTS

| AU | 2007205723 A1 | 2/2009 |
|---|---|---|
| AU | 2019229374 A1 | 5/2020 |

(Continued)

OTHER PUBLICATIONS

Extended European Search Report from corresponding European Patent Application No. EP22173094.8, Oct. 18, 2022.

(Continued)

*Primary Examiner* — Richard T Price, Jr.
(74) *Attorney, Agent, or Firm* — Workman Nydegger

(57) ABSTRACT

The invention relates to a method, system and spine processing device, for loosening meat from a spine portion of a split carcass part of a four-legged slaughter animal, comprising a positioning device for positioning the carcass part; a cutting device for loosening the meat, by cutting, from spinous process parts and from articular processes, the cutting device comprising a first cutter for cutting along the spinous process parts; a second cutter for cutting along an outer side of the articular processes; a third cutter for cutting along an upper side of the articular processes. The second cutter is movable transverse to the cutting direction, relative (Continued)

to the first cutter. The cutting device has an urging element for urging the second cutter towards the first cutter in the transverse direction while cutting, such that the second cutter cuts along the outer side of the articular processes.

16 Claims, 9 Drawing Sheets

(56) References Cited

U.S. PATENT DOCUMENTS

| | | | |
|---|---|---|---|
| 5,725,424 A | | 3/1998 | Dufour et al. |
| 6,050,889 A | * | 4/2000 | Jacobs ................ A22B 5/0005 452/160 |
| 8,096,860 B2 | | 1/2012 | Bolte et al. |
| 11,785,956 B2 | * | 10/2023 | Jacobs .................. A22C 17/02 452/157 |
| 2004/0029514 A1 | * | 2/2004 | Kruger ................ A22B 5/0029 452/155 |
| 2009/0124186 A1 | * | 5/2009 | Klein ...................... A22B 5/20 452/152 |
| 2013/0344787 A1 | | 12/2013 | Bolte et al. |
| 2014/0378040 A1 | | 12/2014 | Taniguchi et al. |

FOREIGN PATENT DOCUMENTS

| | | |
|---|---|---|
| DE | 10347631 A1 | 5/2005 |
| EP | 0365452 A1 | 4/1990 |
| EP | 0392874 A2 | 10/1990 |
| EP | 0627168 A1 | 12/1994 |
| EP | 0714607 A1 | 6/1996 |
| EP | 0743618 A2 | 11/1996 |
| EP | 1059037 A2 | 12/2000 |
| EP | 1116441 A2 | 7/2001 |
| EP | 0985348 B1 | 6/2004 |
| EP | 1736057 A1 | 12/2006 |
| EP | 1741340 A2 | 1/2007 |
| EP | 1832173 A1 | 9/2007 |
| EP | 2022334 A1 | 2/2009 |
| EP | 1893029 B1 | 9/2009 |
| EP | 1893031 B1 | 10/2012 |
| EP | 2566339 B1 | 1/2017 |
| EP | 3307073 B1 | 4/2019 |
| GB | 2581553 A | 8/2020 |
| RU | 2090069 C1 | 9/1997 |
| WO | 9419958 A1 | 9/1994 |
| WO | 9517825 A1 | 7/1995 |
| WO | 9717853 A2 | 5/1997 |
| WO | 9730594 A1 | 8/1997 |
| WO | 9908538 A1 | 2/1999 |
| WO | 9959417 A1 | 11/1999 |
| WO | 0182706 A2 | 11/2001 |
| WO | 2003032739 A1 | 4/2003 |
| WO | 2004103080 A1 | 12/2004 |
| WO | 2005084449 A1 | 9/2005 |
| WO | 2007105299 A1 | 9/2007 |
| WO | 2011152737 A1 | 12/2011 |
| WO | 2012125048 A1 | 9/2012 |
| WO | 2013136995 A1 | 9/2013 |
| WO | 2013165260 A1 | 11/2013 |
| WO | 2017036458 A1 | 3/2017 |
| WO | 2019050416 A2 | 3/2019 |

OTHER PUBLICATIONS

International Search Report from corresponding PCT Application No. PCT/EP2023/062582, Aug. 28, 2023.

* cited by examiner

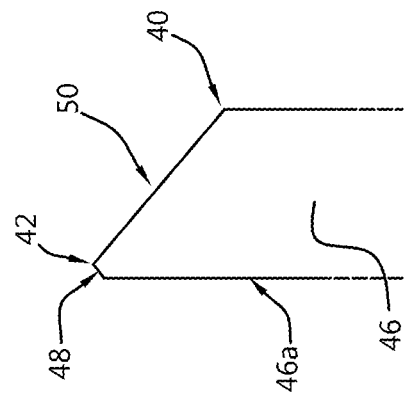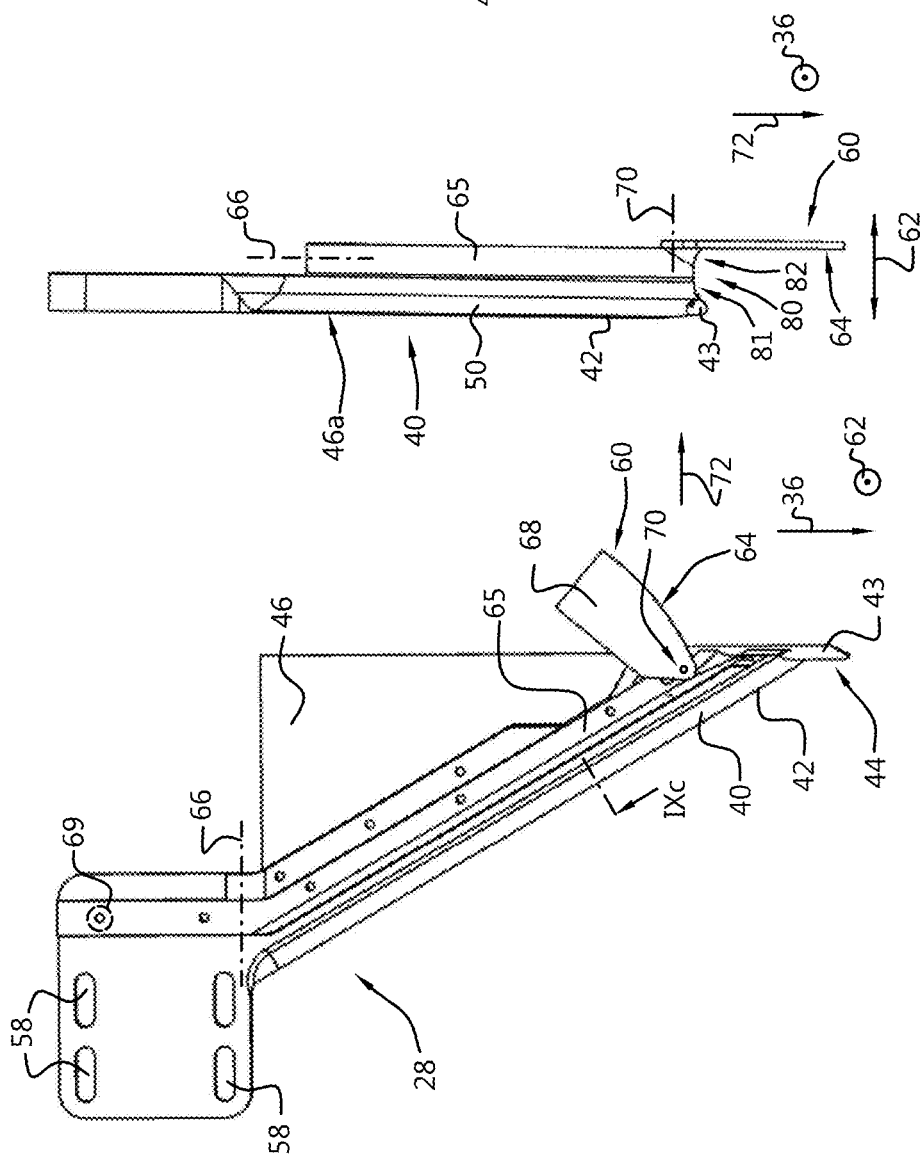

SPINE PROCESSING DEVICE

TECHNICAL FIELD

The present invention relates to a spine processing device, for loosening meat, preferably loin meat, from a spine portion of a split carcass part of a four-legged slaughter animal, such as a pork carcass part, the spine portion including split vertebrae with respective spinous process parts, spinal body parts, articular processes and transverse processes. Such split carcass parts of other four-legged slaughter animals such as of cattle or sheep may be processed with the device and method according to the present invention as well.

BACKGROUND

WO 2004/103080 A1 relates to a loin boning apparatus. Meat is removed from the loin region of the slaughtered animal by clamping the loin to a moveable carriage and advancing the carriage toward and past first and second knives mounted on adjustable arms and perpendicular to each other. The apparatus comprises a relatively complex combination of cutters and positioning means for cutting along the spine.

It is an object of the present invention to provide an improved spine processing device and method.

It is an object of the present invention to provide a spine processing device and method by means of which the yield of meat loosened from the spine portion may be controlled and/or increased.

It is an object of the present invention to provide a spine processing device and method which are suitable to a larger extent to adapt to varying sizes and shapes of spine portions to be processed.

SUMMARY

One or more of the above-mentioned objects have been achieved by the spine processing device, the spine processing system and the method according to the present invention.

According to the invention, a spine processing device is provided, for loosening meat, preferably loin meat, from a spine portion of a split carcass part of a four-legged slaughter animal, such as a pork carcass part, the spine portion including split vertebrae with respective spinous process parts, spinal body parts, articular processes and transverse processes.

The spine processing device comprises:
a positioning device for positioning the carcass part;
a cutting device for loosening the meat, by cutting, from the spinous process parts and from the articular processes, in a cutting direction which may be parallel to a length direction of the spine portion. That means that the cutting direction may be parallel to a length direction of the spine portion during use.

The cutting device comprises:
a first cutter configured for cutting along the spinous process parts;
a second cutter configured for cutting along an outer side of the articular processes;
a third cutter in between the first cutter and the second cutter, for cutting along an upper, dorsal side of the articular processes.

The first, second and third cutters are mutually connected for joint movement relative to the carcass part.

The second cutter is movable in a transverse direction transverse to the cutting direction, relative to the first cutter.

The cutting device further has an urging element for urging the second cutter towards the first cutter in the transverse direction during use while cutting, such that the second cutter cuts along the outer side of the articular processes.

An effect of the device according to the invention is that by means of the single cutting device having the first, second and third cutters, which are mutually connected for joint movement relative to the carcass part, in combination with the urging element which urges the second cutter towards the first cutter and by doing so keeps the second cutter cutting along the articular processes, a very effective cutting operation can be performed using a cutting device of a relatively simple construction, which is suitable to a larger extent to adapt to varying sizes and shapes of spine portions to be processed. Also, the yield may be increased in comparison to, for instance, known cutting devices that do not have such an urging element and/or that do not move relative to the carcass part. During use, the second cutter, as a result of its movability relative to the first cutter, and while urged towards the first cutter, can effectively follow the outer sides of the articular processes, irrespective of a varying shape of articular processes along the length of the spine portion. In order to maximize the yield of meat loosened from the spine portion, the urging element may be configured for urging the second cutter towards the first cutter in the transverse direction during use while cutting, such that the second cutter cuts directly along the outer side of the articular processes. However, for some application, it may be desirable to have one or more than one of the first cutter, the second cutter and the third cutter to follow the contour of the spine portion and cut the meat at a predetermined distance from the spine portion, thereby deliberately leaving a little meat on the spine portions. In other words, one or more than one of the first cutter, the second cutter and the third cutter may be moved at a predetermined distance along the spine portions, thereby controlling a thickness of a layer of meat that is to remain at the spine portions.

In an embodiment, the carcass part is of a porcine, bovine, caprine, ovine or camelid slaughter animal. In an embodiment, the carcass part is a pork, cattle, sheep or goat carcass part, preferably a pork carcass part.

In the present description and claims, with 'a spine portion' is meant a portion of the spine obtained by an earlier operation of a splitting of a carcass or part thereof along the spine.

In an embodiment, the first cutter has a guide pin projecting from a forward side of the first cutter in the cutting direction, for guiding the first cutter along the spinous process parts in between the spinous process parts and the articular processes. This contributes to a reliable cut along the spinous process parts.

In an embodiment, the first cutter may have a first bevel at an inner side of the cutter facing the spinous process part during use and a second bevel larger than the first bevel on an opposite, outer side, such that the first cutter will tend to move towards the spinous process part during cutting as a result of forces acting on the first cutter by the meat. In an embodiment, the first cutter may have a single bevel, at the outer side facing away from the spinous part during use. A force acting on the first cutter on the second bevel side, or outer side, will then be larger than on the first bevel side, as a result of which the first cutter will tend to move towards the spinous process part, keeping the first cutter cutting directly along the spinous process part. This may increase the meat yield. The first bevel may contribute to preventing the first cutter cutting into the spinous process part. Alternatively, the first cutter may be moved towards the spinous process part and moved there along at a predetermined distance, if it is desired to deliberately leave a thin layer of meat on the spine portion.

In an embodiment, the second cutter is pivotable relative to the first cutter about a pivot axis extending perpendicular to the cutting direction and to the transverse direction, preferably wherein the second cutter is provided at a free end of a pivot arm pivotally connected to the first cutter about the pivot axis. This way, the second cutter may be positioned relative to the spine portion independent of the first cutter. During use, that means during execution of an embodiment of a method according to the invention, the second cutter thus pivots relative to the first cutter and thereby moves towards and away from the first cutter such as in dependence on the varying shape of articular processes along the length of the spine portion, while being urged towards the first cutter by the urging element.

In an embodiment, the second cutter has a blade portion with a cutting edge on a forward facing side of the blade portion. The blade portion may be designed such that it extends along a plurality of successive articular processes in the cutting direction. The blade portion may for that purpose have a dimension in the cutting direction of at least 5 cm, preferably at least 7 cm, and further preferably at most 15 cm. The blade portion may be positioned to be urged towards, and more particular against, the outer side of the articular processes by the urging element. The urging element may act on said pivot arm for the purpose of urging the blade portion against the outer side of the articular process. The urging element may be or comprise a passive urging element like a coil spring or may be actively controllable such as using a pneumatic cylinder so that a contact pressure between the second cutter and the articular process may be adjusted or controlled to a larger extent. The urging element may be positioned to act on the pivot arm. The blade portion is urged towards the articular processes, and may be kept at a predetermined distance from the articular processes to deliberately leave a layer of meat on the bone. However, if the blade portion is urged against the articular processes, substantially all meat will be cut off the bone, thereby maximizing the yield of meat loosened from the spine portion.

In an embodiment, the cutting edge of the second cutter is at least substantially parallel to a cutting edge of the first cutter, seen in the cutting direction.

In an embodiment, a blade portion of the second cutter is pivotable relative to the first cutter about a further pivot axis extending in the transverse direction. The cutting device may have a further urging element for urging a cutting edge of the second cutter towards the transverse processes in use, in a direction perpendicular to the cutting direction and to the transverse direction. So, during use, during execution of method according to the invention, the further urging element urges the cutting edge of the second cutter towards the transverse processes while cutting. This way, it may be realised that the second cutter keeps in contact with the transverse process and the cut by the second cutter will in that case be of maximum depth.

In an embodiment, the third cutter may have a cutting edge on a forward side. It may further have a guide portion past the cutting edge, the guide portion being designed such that it extends over a plurality of successive articular processes in the cutting direction. For this purpose, a length, in the cutting direction, of the third cutter is at least 5 cm, preferably at least 7 cm, and further preferably at most 15 cm. This contributes to preventing that the third cutter cuts into an articular process.

In an embodiment, the third cutter has a fixed part fixated to the first cutter, and has a movable part fixated to the second cutter, so that in use the movable part moves relative to the first cutter jointly with the second cutter. This way, the third cutter may adapt to a width dimension, in the transverse direction, of the articular processes.

In an embodiment, the fixed part and the movable part have overlapping respective cutting edges configured such that in use, upon movement of the second cutter relative to the first cutter, said respective cutting edges remain in an overlapping arrangement with respect to each other. This way, a continuous cutting edge is realised which increases the effectiveness of the cut. The cutting edge of the movable part may be a continuation of the cutting edge of the fixed part.

In an embodiment, the positioning device is configured for positioning the carcass part at least while cutting. In an embodiment, the positioning device comprises a positioning element configured to contact a cut surface of the spine portion, wherein the positioning element defines a positioning plane for the cut surface. The positioning element may be plate-shaped. A front, contact surface of the plate-shaped positioning element then defines the positioning plane. The cut surface of the spine portion is thus urged against the plate-shaped positioning element during use, at least while cutting.

The positioning device may further comprise a pressing device for pressing the spine portion against the positioning element, preferably by pressing directly against the spine portion.

By the provision of the positioning element configured to contact a cut surface of the carcass part and defining a positioning plane, combined with the pressing device, a stable and well-defined positioning of the carcass part for the purpose of the cutting operations is achieved, by means of which the spine portion is more robustly positioned.

The cutting direction is parallel to the positioning plane. The mentioned cut surface is a cut surface resulting from a previously performed cutting action through the spine for the purpose of splitting the carcass part. The transverse direction is perpendicular to the positioning plane and, in case of a plate-shaped positioning element, to the front, contact surface of the plate-shaped positioning element.

A cutting edge of the first cutter may extend in a first plane parallel to the positioning plane. A cutting edge of the second cutter may extend in a second plane parallel, or at least substantially parallel, to the positioning plane.

In an embodiment, the pressing device comprises a plurality of successive pressing units arranged successively in a cutting direction of the cutting device, the cutting direction being parallel to the positioning plane and thus to a length direction of the spine portion in use, the plurality of successive pressing units each having:
  a pressing element individually movable towards and from the positioning element for pressing the spine portion against the positioning element; and
  a moving device for moving the pressing element from an inactive position in which it is free from the carcass part in use, towards an active position in which the pressing element pushes against the carcass part for positioning the spine portion against the positioning element.

Using such pressing units, the spine portion may be very effectively pressed against the positioning element and thereby effectively and reliably be positioned and held for the purpose of cutting.

In an embodiment, the positioning device further comprises a rod-shaped element in a fixed position relative to the positioning element, wherein the rod-shaped element extends in the cutting direction, that means parallel to the positioning plane, in line with the successive pressing elements at least in a position of the pressing elements between the passive and the active position. In use, a first part of the length of the spine portion may be pressed against the positioning element by the plurality of pressing elements and a second, remaining part of the length of the spine portion may lie against the rod-shaped element. Such a rod-shaped element is of a very simple construction but is a very effective manner of positioning a part of the spine portion for the purpose of cutting. In an embodiment, the spine portion lies with spinal body parts thereof against the rod-shaped element.

In an embodiment, the positioning device has a plurality of gripping elements, each protruding from the positioning element and configured to engage the spine portion from the cut surface, preferably hook into a split neural canal of the spine portion, preferably wherein each of the plurality of pressing units has an associated gripping element. Such gripping elements further contribute to the reliable and effective positioning of the spine portion.

In an embodiment, in use, the carcass part may be suspended from a carrier connected to and moved by an overhang transport system arranged for conveying the carcass part along a transport trajectory past the spine processing device.

The invention also relates to a spine processing system for loosening meat, preferably loin meat, from a spine portion of a split carcass part of a four-legged slaughter animal, such as a pork carcass part, the spine processing system comprising:
   an overhang transport system having a plurality of carriers for transporting the split carcass part along a transport trajectory, each of the plurality of carriers arranged for suspending a carcass part therefrom;
   a spine processing device according to the invention, provided along the transport trajectory.

In an embodiment of the device and/or of the system in which the carcass part is suspended from such a carrier, the spine processing device may comprise a moving device for moving the spine processing device over a predetermined distance along the conveying trajectory, at least during the loosening of the meat from the spine portion. This way, the carriers may be moved in a continuous manner, by which is meant opposite to an indexing manner, along the spine processing device.

The invention also relates to a method for loosening meat, preferably loin meat, from a spine portion of a split carcass part of a four-legged slaughter animal, such as a pork carcass part, the spine portion including split vertebrae with respective spinous process parts, spinal body portions, articular processes and transverse processes,
   the method comprising:
   positioning the carcass part;
   loosening the meat, by cutting using a cutting device, from the spinous process parts and from the articular processes, in a cutting direction in use parallel to a length direction of the spine portion,
   the cutting comprising:
   cutting along the spinous process parts using a first cutter of the cutting device;
   cutting along an outer side of the articular processes using a second cutter of the cutting device, wherein the second cutter is movable in a transverse direction transverse to the cutting direction relative to the first cutter;
   cutting along an upper, dorsal side of the articular processes using a third cutter of the cutting device in between the first cutter and the second cutter;
   the first, second and third cutter jointly moving relative to the carcass part during cutting, and
   urging the second cutter towards the first cutter in the transverse direction during cutting, such that the second cutter cuts along the outer side of the articular processes, using an urging element of the cutting device.

In a preferred embodiment of the method, the step of urging the second cutter towards the first cutter in the transverse direction during cutting by using an urging element of the cutting device, comprises urging the second cutter such that it cuts directly along the outer side of the articular processes.

In an embodiment, the method comprises:
   positioning the carcass part by means of a positioning device, wherein the carcass part, with a cut surface thereof, is brought into contact with a positioning element that defines a positioning plane for the cut surface;
   pressing the spine portion against the positioning element using a pressing device; and
   loosening the meat, by cutting, from the spine portion.

In an embodiment of the method, a device according to the invention or a system according to the invention may be used.

Embodiments of the invention described in relation to the device according to the invention apply in an analogous manner to the system and method according to the invention, and vice versa. Effects of embodiments of the device also apply to embodiments of the system and method according to the invention, and vice versa.

BRIEF DESCRIPTION OF DRAWINGS

The present invention is described hereinafter with reference to the accompanying schematic drawings in which embodiments of the present invention are shown and in which like reference numbers indicate the same or similar elements.

FIGS. 9a and 9b show, in front view and side view respectively, parts of the cutting device of the spine processing device of FIG. 1, in a first operating state thereof;

FIG. 9c shows section IXc of FIG. 9a;

DESCRIPTION OF EMBODIMENTS

Figure 1:
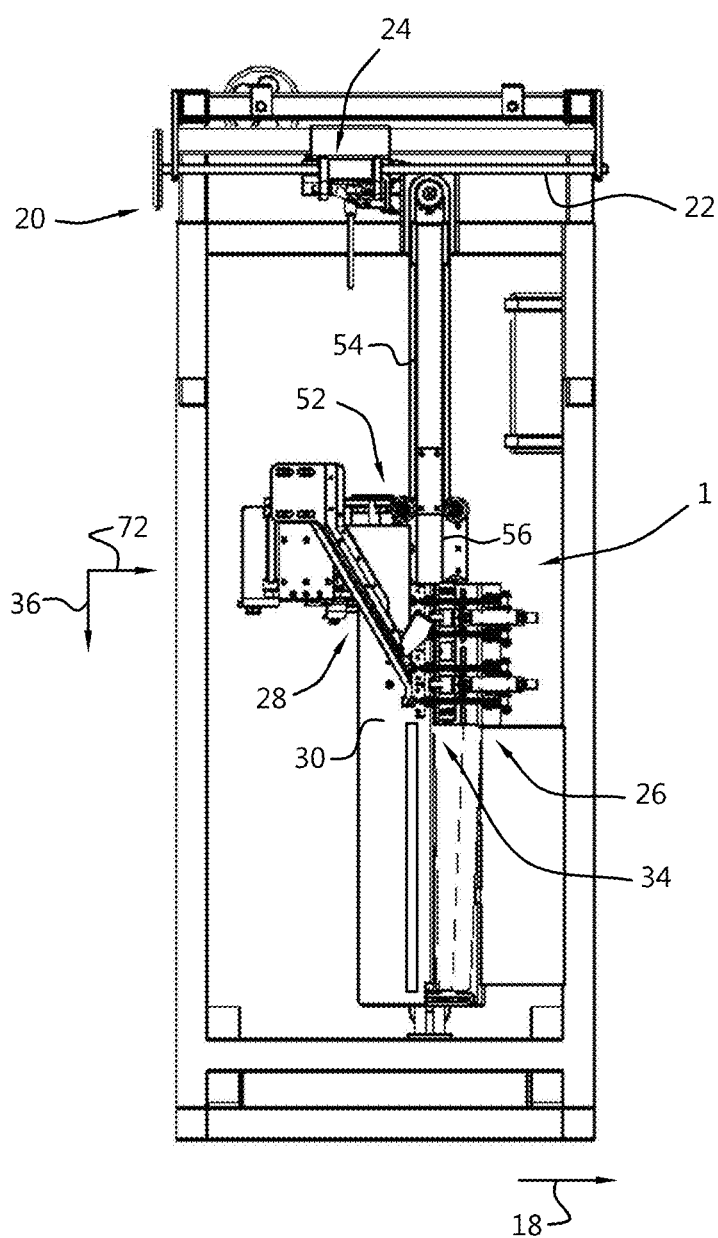
FIG. 1 shows, in front view, an embodiment of a spine processing device according to the present invention.
Figure 2:
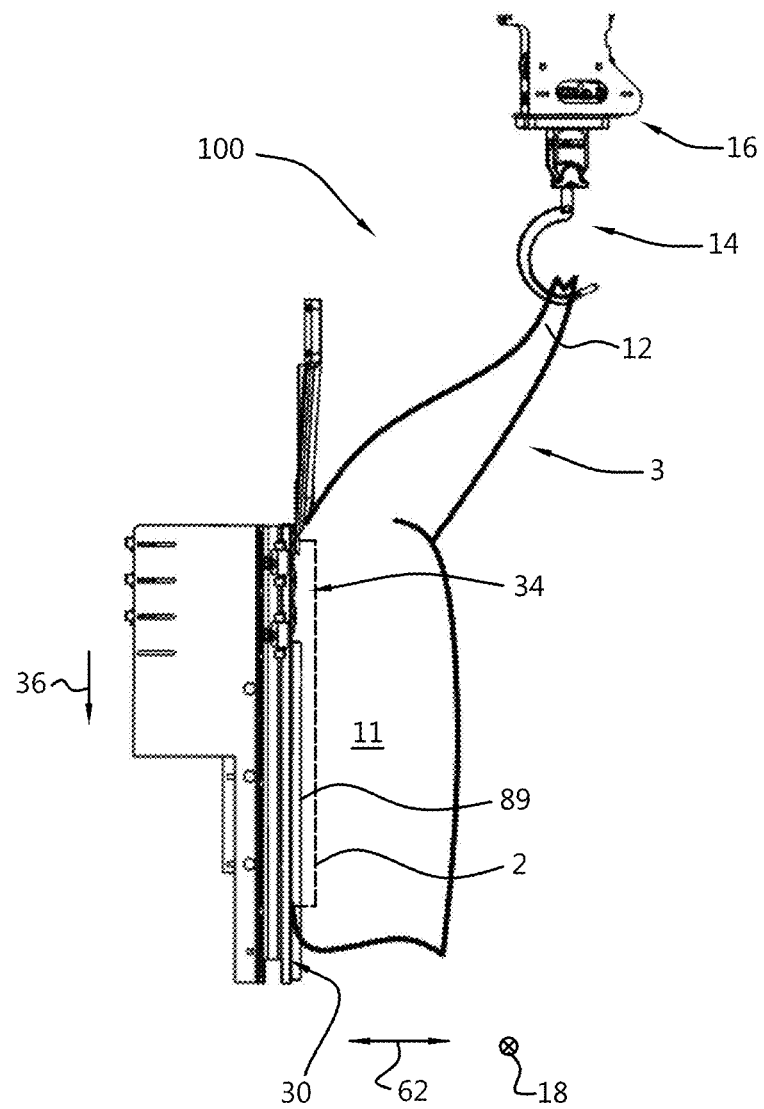
FIG. 2 shows, in side view, a part of the spine processing device of FIG. 1, as part of an embodiment of a spine processing system according to the present invention.
Figure 3:
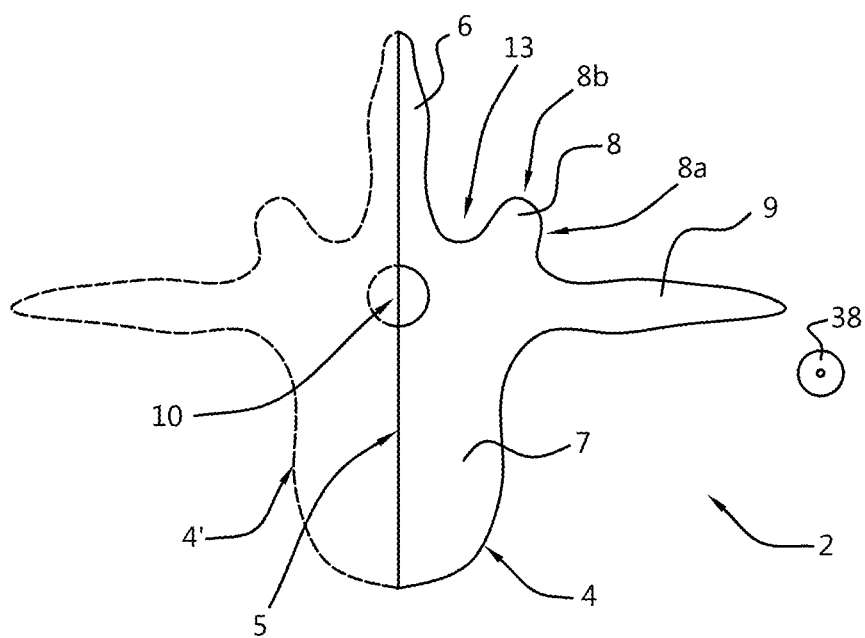
FIG. 3 shows a cross-section of a spine.

FIG. 1 shows a spine processing device 1, which is an example of a spine processing device according to the invention. The spine processing device 1 is configured for loosening meat 11, preferably loin meat, from a spine portion 2 (indicated highly schematically by the dashed line in FIG. 2), of a split carcass part 3 of a four-legged slaughter animal. The example shown in FIG. 2 is a split pork carcass part. The cross-section of the spine portion 2 as shown in FIG. 3 has split vertebrae 4. The spine portion 2 has been obtained by an earlier operation of a splitting of a carcass along the spine thereof, that means by an earlier longitudinal cut through the spine. Such splitting, as is commonly done in carcass part processing and as well-known to the skilled person, results in a split spine, having split vertebrae. In order to be complete, a remaining, that-means cut-off part of the split vertebra shown in FIG. 3 has been indicated by the dashed line identified by reference sign 4'. The split vertebra 4 has a cut surface 5 (resulting from said splitting of the spine). The split vertebra has a spinous process part 6 (in the example shown about half of the spinous process), a spinal body portion 7 (in the example shown about half of the spinal body), an articular process 8, a transverse process 9 and a split neural canal 10. In general, it is noted that the shape of such spine vertebrae may differ depending at least on the position of the vertebra along the length direction of the spine (which is perpendicular to the plane of the paper in FIG. 3) and on the age of the slaughter animal, for example. The articular processes 8 on lumbar vertebrae may be larger than on thoracic vertebrae, and may generally decrease in size from the rear end to the front end of the spine, for example.

FIG. 2 shows a part of a spine processing system 100. The carcass part 3 is suspended by the rear ankle 12, so head-down although the head has already been removed in an earlier processing step, from a carrier 14 connected to and moved by an overhang transport system 16 (shown highly schematically) arranged for conveying the carcass part along a transport trajectory 18 past the spine processing device 1. The spine processing device 1 has a moving device 20 for moving the spine processing device 1 over a predetermined distance along the conveying trajectory 18, at least during the loosening of the meat 11 from the spine portion 2. The moving device 20 may have a linear guide 22 and a drive unit 24 for moving the device 1 back and forth along with the carriers 14.

During use of the system 100, the carcass parts 3 passing along the device 1 for the purpose of loosening meat from the spine thereof, may have been subjected to preceding processing steps upstream along the trajectory 18 like the mentioned splitting of the carcass, and may be subjected to further processing steps like deboning steps, for example.

The spine processing device 1 comprises a positioning device 26 for positioning the carcass part 3. The positioning device 26 has a positioning element 30, which is plate-shaped at least in the present example, configured to contact a cut surface 5 of the spine portion 2. The positioning element 30 defines a positioning plane, which is a plane through, that means flush with, a front contact surface 32 of the plate shaped positioning element 30 for the cut surface 5. The positioning device 26 also has a pressing device 34 for pressing the spine portion 2 against the front, contact surface 32 of the plate-shaped positioning element 30. Further aspects of the positioning device 26 will be detailed below.

The spine processing device 1 also comprises a cutting device 28 for loosening the meat 11, by cutting, from the spinous process parts 6 and from the articular processes 8, in a cutting direction 36 in use parallel to a length direction 38 of the spine portion 2 (that means out of (or into) the plane of the paper in the view of FIG. 3 as indicated). The cutting device 28 is moved along the spine portion 2 in the cutting direction 36 during use of the spine processing device 1. As FIG. 2 shows, the cutting direction 36 is vertical, downward so that the cutting starts at a rear end of the vertically extending spine portion 2 and progresses to a forward end of the spine portion 2. During such a downward cutting movement, the processing device 1 is temporarily moved along with the carrier 14 suspending the carcass part 3. After release of the carcass part 3, the spine processing device 1 moves back upstream so that it is ready for processing a next carcass part suspended from a carrier passing along the device 1.

Figure 4:
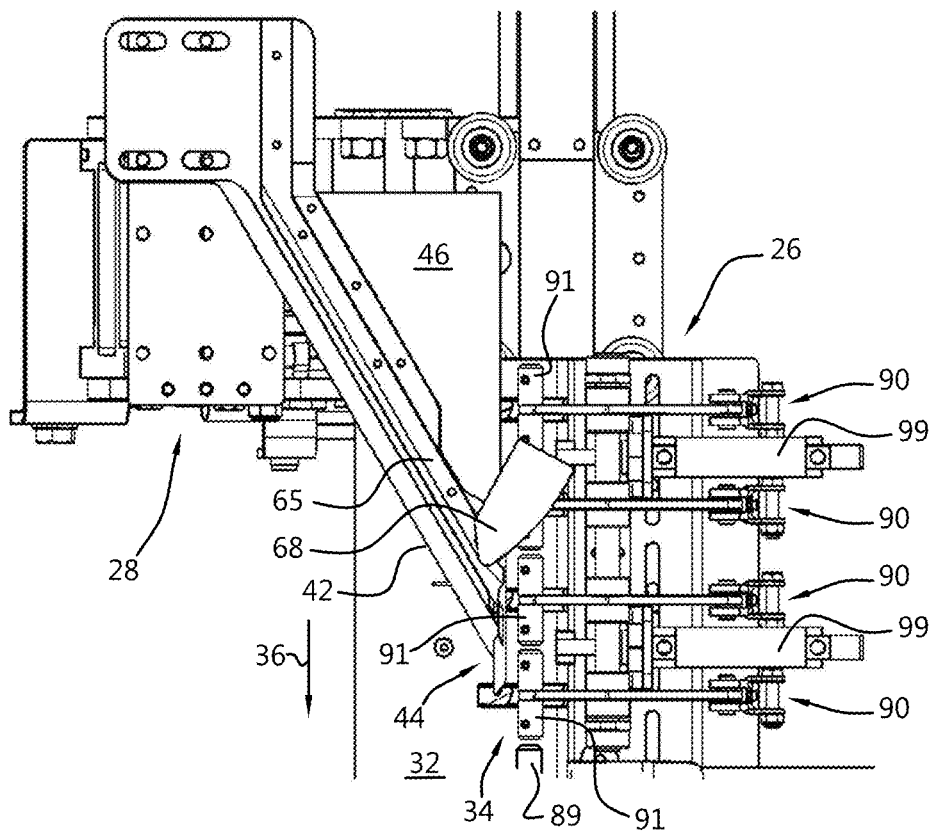
FIG. 4 shows a part of the spine processing device of FIG. 1 in greater detail.
Figure 5:
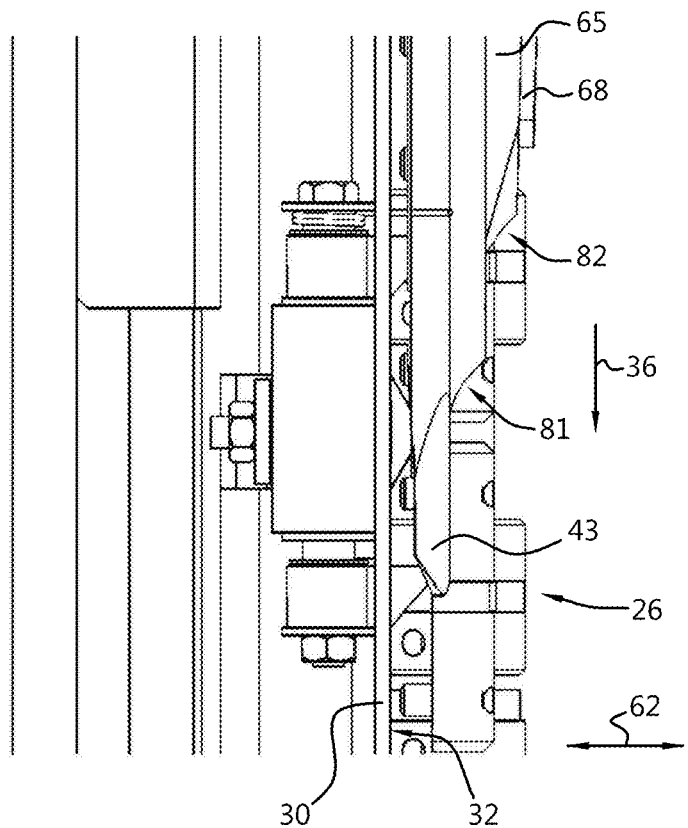
FIG. 5 shows, in side view, a part of the spine processing device of FIG. 1 in greater detail.

The cutting device 28 comprises a first cutter 40 configured for cutting along the spinous process parts 6. For that purpose, the first cutter 40 has a cutting edge 42 inclined backwards from a forward side 44 of the first cutter 40 as FIG. 4 shows. This way, it gradually cuts along the spinous process part 6. FIG. 9c shows a cross-section of a part of the first cutter 40 as such comprising the cutting edge 42. As shown, the first cutter 40 has a blade portion 46 having a spinous process contact side 46a on a left side in the view of FIG. 9b, which blade portion contact side 46a faces the plate-shaped positioning element 30 and thus faces the spinous process part 6 during use while cutting. As FIG. 9c shows, the first cutter 40 has a small bevel 48 at the contact side 46a and a much larger bevel 50 on an opposite, outer side. As a result, the first cutter 40 will tend to move towards the spinous process part 6 during cutting as a result of forces acting on the cutter 40 by the meat 11, more specifically acting on the larger bevel 50 of the first cutter 40. The small bevel 48 has been provided to reduce the risk of inadvertent cutting into the spinous process part 6. The first cutter 40 also has a guide pin 43 projecting from the forward side 44 of the first cutter 40 in the cutting direction 36, for guiding the first cutter 40 along the spinous process parts 6 in between the spinous process part 6 and the articular process 8. A blunt tip of the guide pin 43 prevents the guide pin 43 from penetrating bone parts and provides a reliable guidance of the first cutter 40 through the typically concave, or, curved shaped space 13 between the spinous process part 6 and the articular process 8 and running parallel along the spine portion.

The first cutter 40 is fixedly connected via slotted mounting holes 58 to a moving device 52 for moving the cutting device 28 downward in the cutting direction 36 and upwards against the cutting direction. The moving device 52 may comprise a guide 56 and a chain or belt drive 54 for providing the vertical movement.

Figure 10B:
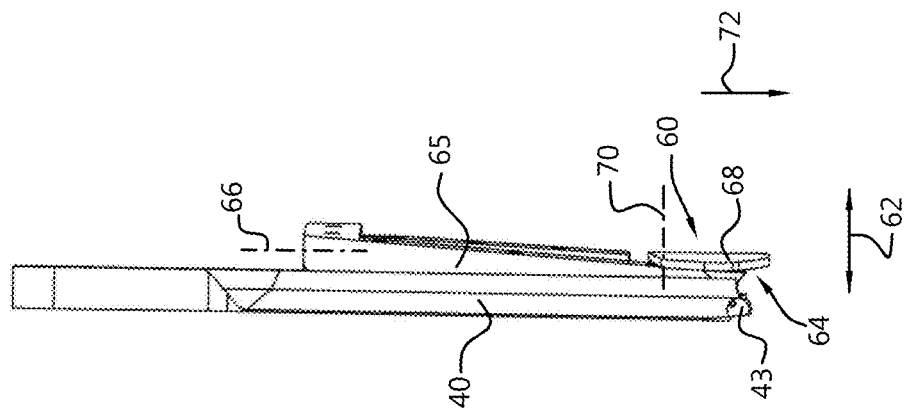
FIGS. 10a and 10b show, in front view and side view respectively, the parts of the cutting device of the spine processing device of FIGS. 9a and 9b, in a second operating state thereof.

The cutting device 28 also has a second cutter 60 configured for cutting along an outer side 8a of the articular processes 8. The second cutter 60 has a cutting edge 64, which, although only visible in FIG. 8, has a similar shape having an inner, smaller bevel and an outer, larger bevel as the first cutter 40 as shown in FIG. 9c and explained above. The second cutter 60 has a blade portion 68 with the cutting edge 64 on a forward-facing side of the blade portion 68, the blade portion 68 being designed, that means having a dimension in the cutting direction 36, such that it extends along a plurality of successive articular processes 8 in the cutting direction 36. In other words, a dimension of the second cutter 60 in the cutting direction 36 is such that the second cutter 60 cannot end up between two successive vertebra 4, or at least the change thereof is relatively small. The cutting edge 64 of the second cutter is at least substantially parallel to the cutting edge 42 of the first cutter 40, seen in the cutting direction 36 as FIGS. 9b and 10b show. With 'at least substantially' is meant in this regard that irrespective of a slight possible pivoting movement of the second cutter 60 with respect to the first cutter 40, as will be explained next, that still both cutters can be considered to be oriented about parallel during use.

The second cutter 60 is movable in a horizontal transverse direction 62 transverse to the cutting direction 36, relative to the first cutter 40. The transverse direction 62 extends perpendicular to the plate-shaped positioning element 30 and thereby to the mentioned positioning plane. In order to provide for said movement, the blade portion 68, having the cutting edge 64, is mounted to a free end of a pivot arm 65 of the second cutter 60. The pivot arm 65 is connected, in a pivotal manner about a pivot axis 66, to the first cutter 40. The pivot axis 66 extends perpendicular to the cutting direction 36 and to the transverse direction 62 as FIG. 9a shows. That means, like the cutting direction 36, the pivot axis 66 extends in a virtual plane parallel to the plate-shaped positioning element 30. FIG. 9b shows a maximum pivoting movement of the second cutter 60 away from the first cutter 40 in the transverse direction 62. FIG. 10b shows a position of the second cutter 60 in which it has pivoted in the transverse direction 62 towards the first cutter to a position closest to the first cutter 40. The purpose of this movability of the second cutter 60 relative to the first cutter 40 is to realise that, while the first cutter 40 cuts along the spinous process 6, the cutting edge 64 of the second cutter 60 cuts, that means, keeps cutting, at a predetermined distance from, or directly along, the outer side 8a of the articular processes 8 during use, also when the cross-sectional shape of the successive spinous process parts 6 and/or articular processes 8 of the vertebrae 4 would vary over the length of the spine portion 2. For this purpose, the cutting device 28 further has an urging element 69 (see FIG. 9a) in the form of a compression spring, for urging the second cutter 60 towards the first cutter 40 in the transverse direction 62 during use while cutting. The urging element acts on the pivot arm 65 to which the blade portion 68 of the second cutter 60 is connected, and urges it to pivot about pivot axis 66 in the direction of the first cutter 40, that means, in consideration of FIGS. 9b and 10b, from the maximal position shown in FIG. 9b towards the minimal position shown in FIG. 10b. As a result of the provision of the urging element 69, the blade portion 68 of the second cutter 60 is, that means, remains urged against the outer side 8a of the articular processes 8 during the cutting along the spine portion 2. Consequently, a highly effective cut at a predetermined distance from, or directly along, the outer sides 8a of the articular processes 8 may be made, resulting in a high meat yield. With regard to the mentioned varying cross-sectional shape of the spine portion 2 FIG. 8 may be compared to FIG. 3. Both may show, although drawn highly schematic, a cross-section of a vertebra of the same spine portion. For convenience the same parts of the vertebra have been identified by the same reference signs.

Figure 10A:
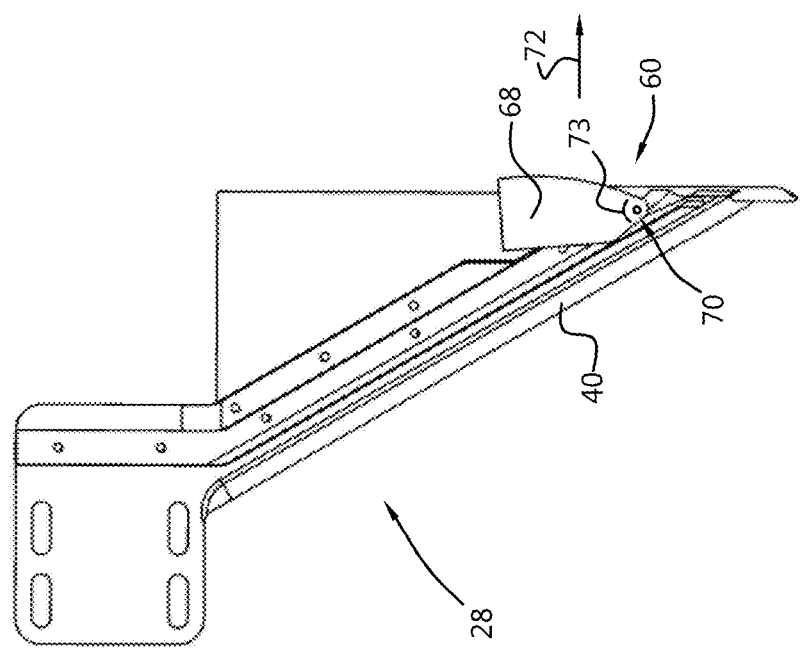

The blade portion 68 of the second cutter 60 is pivotable relative to the first cutter 40 about a further pivot axis 70 extending in the transverse direction 62. More specifically, the blade portion 68 is pivotally connected, about the pivot axis 70, to the pivot arm 65 of the second cutter 60. The cutting device 28 has a further urging element 73 (see FIG. 10a) in the form of a torsion spring, operative at the location of the pivot axis 70 between the blade portion 68 and the pivot arm 65, for urging the cutting edge 64 of the blade portion 68 of the second cutter 60 towards the transverse processes 9 in use, in a direction 72 perpendicular to the cutting direction 36 and to the transverse direction 62. The function of this pivoting movement about the further pivot axis 70 is that the second cutter 40 keeps following the transverse processes 9 while cutting along the spine portion 2 and achieves that the cut by the second cutter 60 is as deep into the meat 11 along the articular processes 8 as possible, limited by the transverse processes 9. FIGS. 9a and 9b show the blade portion 68 pivoted to a larger extent in the direction 72 compared to FIGS. 10a and 10b.

The cutting device 28 also has a third cutter 80 in between the first cutter 40 and the second cutter 60, for cutting along an upper, dorsal side 8b of the articular processes 8. The first, second and third cutters are mutually connected for joint movement relative to the carcass part 3 in the cutting direction 36. This is achieved by the fact that the second cutter 60 and third cutter 80 cutter are mounted to the first cutter 40, the latter being moved in the cutting direction 36 in use thereby automatically letting the second 60 and third 80 cutter move along. The third cutter 80 has a fixed part 81 fixated to the first cutter 40, and has a movable part 82 fixated to the second cutter 40, so that in use the movable part 82 moves relative to the first cutter 40 jointly with the second cutter 60. The movable part 82 is fixated to the pivot arm 65 which includes an embodiment in which the movable part 82 is a cutter-shaped end of the pivot arm 65.

Figure 7:
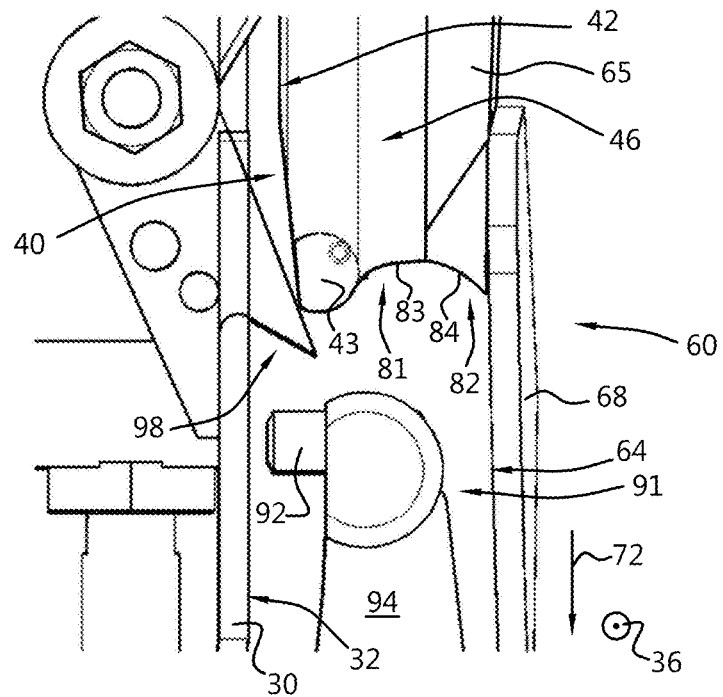
FIG. 7 shows, in bottom view, parts of a cutting device and of a positioning device of the spine processing device of FIG. 1 in greater detail.
Figure 11:
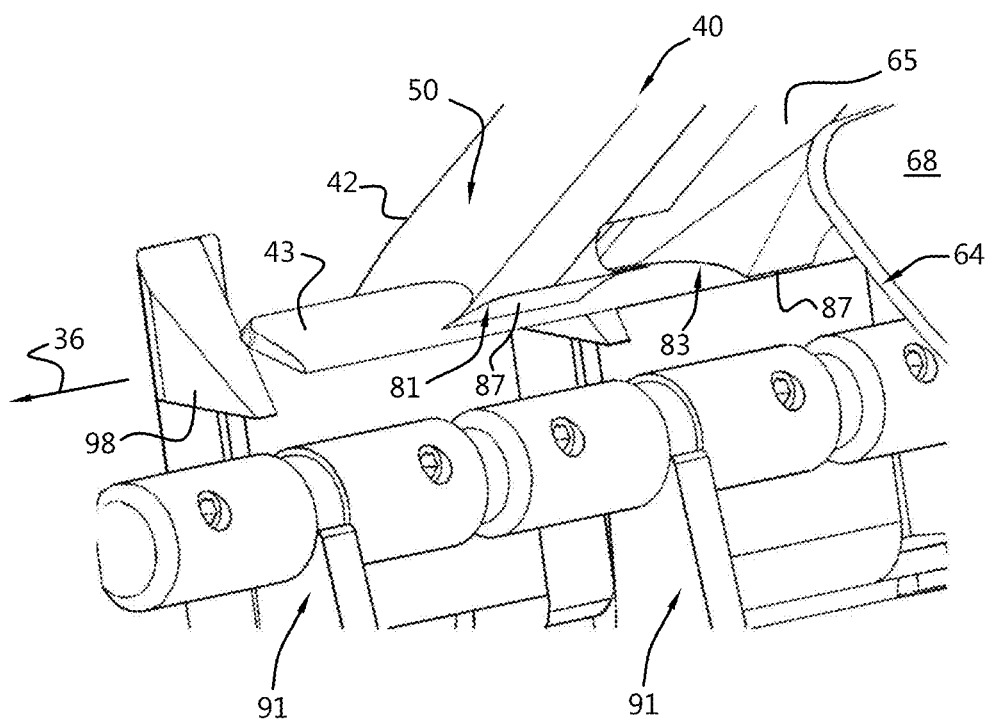
FIG. 11 shows, from the side and below, a part of the cutting device and of the positioning device of the spine processing device of FIG. 1 in greater detail.

The third cutter has a cutting edge 83, 84 and a guide portion 87 past the cutting edge, the guide portion 87 being designed such that it extends over a plurality of successive articular processes 8 in the cutting direction 36 so as to avoid that the third cutter cuts into an articular process 8. The fixed part 81 and the movable part 82 have overlapping respective cutting edges 83 and 84 configured such that in use, upon movement of the second 60 cutter relative to the first cutter 40 and consequently of the movable part 82 relative to the fixed part 81, said respective cutting edges 83, 84 remain in an overlapping arrangement with respect to each other as can be understood from FIG. 11. The cutting edge 84 of the movable part 82 is a continuation of the cutting edge 83 of the fixed part 81 at least seen in the cutting direction 36 as FIG. 7 shows in detail. During movement of the cutting device 28 in the cutting direction, a slight movement of the first, second and third cutter relative to the moving device 52 in the direction 72 is allowed so that the third cutter 80 may slide over the tops 8b of the articular processes, as it were, while urged in the direction 72 against the upper sides 8b of the articular processes. The device 1 has still a still further urging element, such as formed by a pneumatic cylinder, operative between the first cutter 40 and the moving device 52 for the purpose of providing said slight movement of the first cutter 40, and thereby jointly of the first, second and third cutter, in the direction 72.

As explained above, the positioning device 26 is configured to position the carcass part 3 with the cut surface 5 of the spine portion 2 in a positioning plane, against the plate-shaped positioning element 30. The cutting direction 36 is parallel to the positioning plane 32 and vertically downwards in the example according to the figures. In any case, the cutting direction 36 is in the direction of extension of the spine portion 2. A cutting edge 42 of the first cutter 40 extends in a virtual plane parallel to the positioning plane. The cutting edge 64 of the second cutter 60 extends in another virtual plane also parallel to the positioning plane, more specifically at least substantially parallel within the bounds of the mutual movement of the second cutter 60 relative to the first cutter 40.

The positioning device 26 will now be described in more detail. As already described above, the positioning device 26 has a plate-shaped positioning element 30, configured to contact the cut surface 5 of the spine portion 2, and has a pressing device 34 for pressing the spine portion 2 against the contact surface 32 of the plate-shaped positioning element 30. The plate-shaped positioning element 30 is formed as a flat contact plate. This way, the spine portion 2 of the carcass part 3 to be processed is pressed and thereby well-positioned against a defined contact surface.

Figure 6:
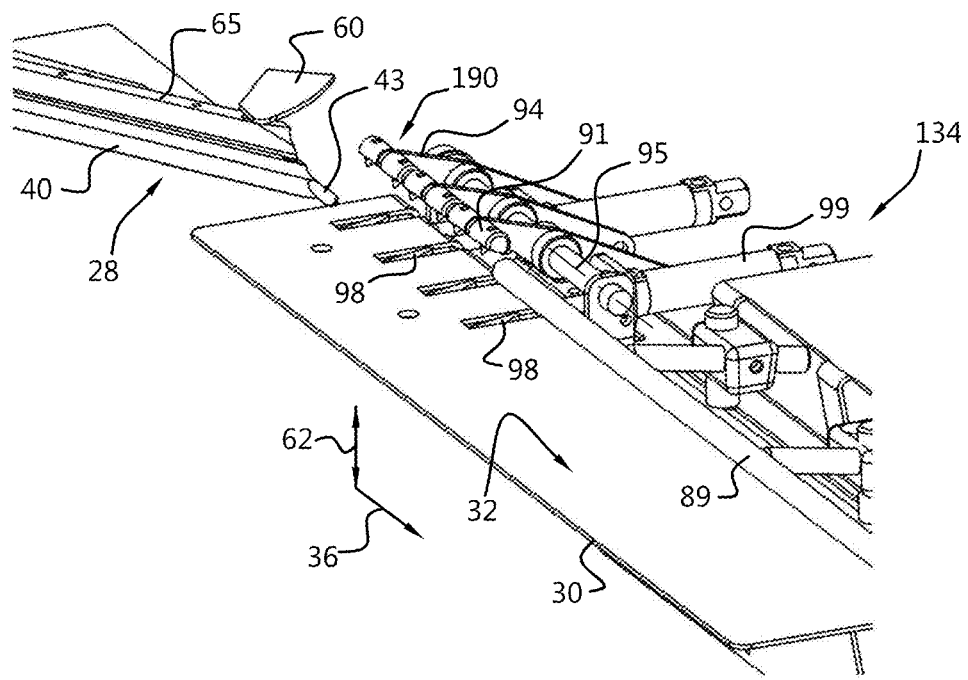
FIG. 6 shows, from the side and below, a part of the spine processing device, similar to that of FIG. 1 but having a different embodiment of a pressing device, in greater detail.

The pressing device 34 comprises a plurality of, in the positioning device 26 four, successive pressing units 90 arranged successively in the cutting direction 36. The embodiment of the pressing device 134 shown in FIG. 6 has a plurality of three successive pressing units 190. Other than that, the pressing device 134 is the same as, or at least very similar to, pressing device 34 so the below description of pressing device 34 also applies to pressing device 134 in an analogous manner.

Figure 8:
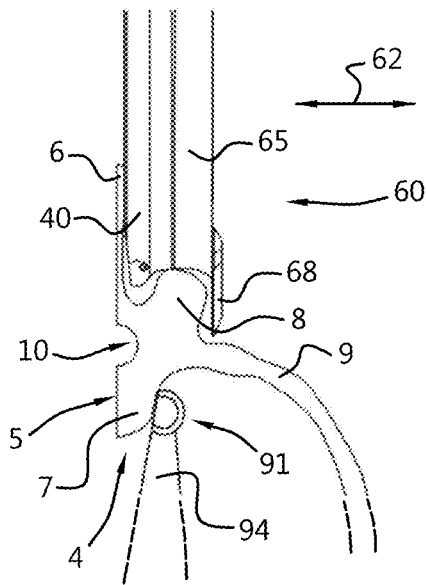
FIG. 8 shows, in bottom view, parts of the cutting device of the spine processing device of FIG. 1, in combination with a cross-section of a spine portion.
Figure 12A:
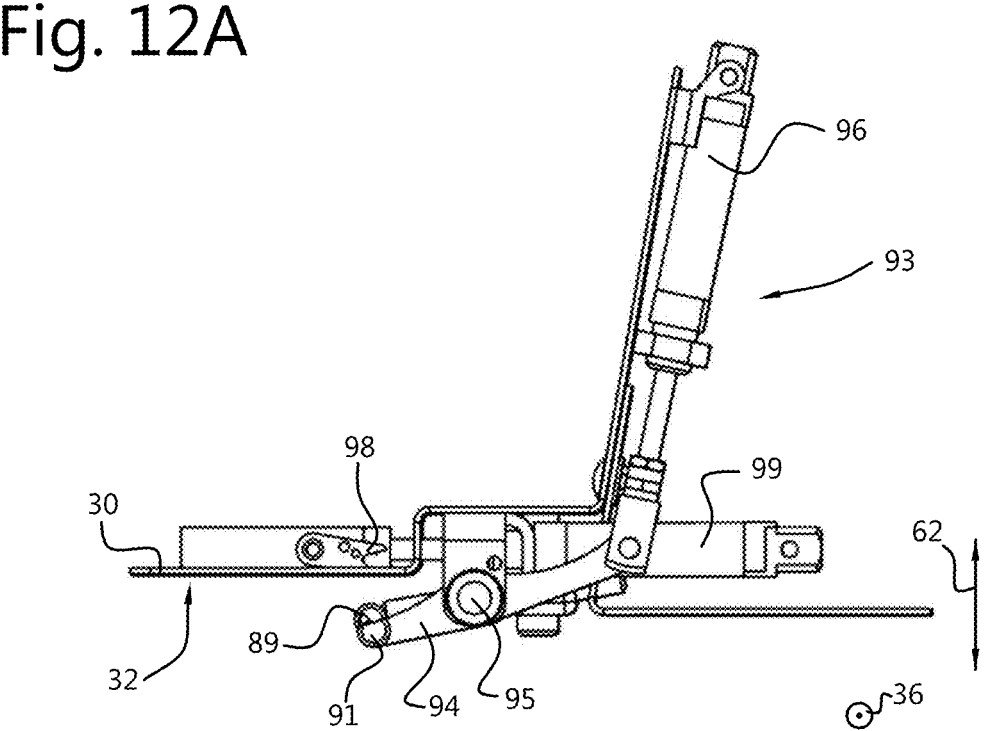
FIGS. 12a and 12b show, in top view, parts of the positioning device of the spine processing device of FIG. 1 in two respective operating states thereof.
Figure 12B:
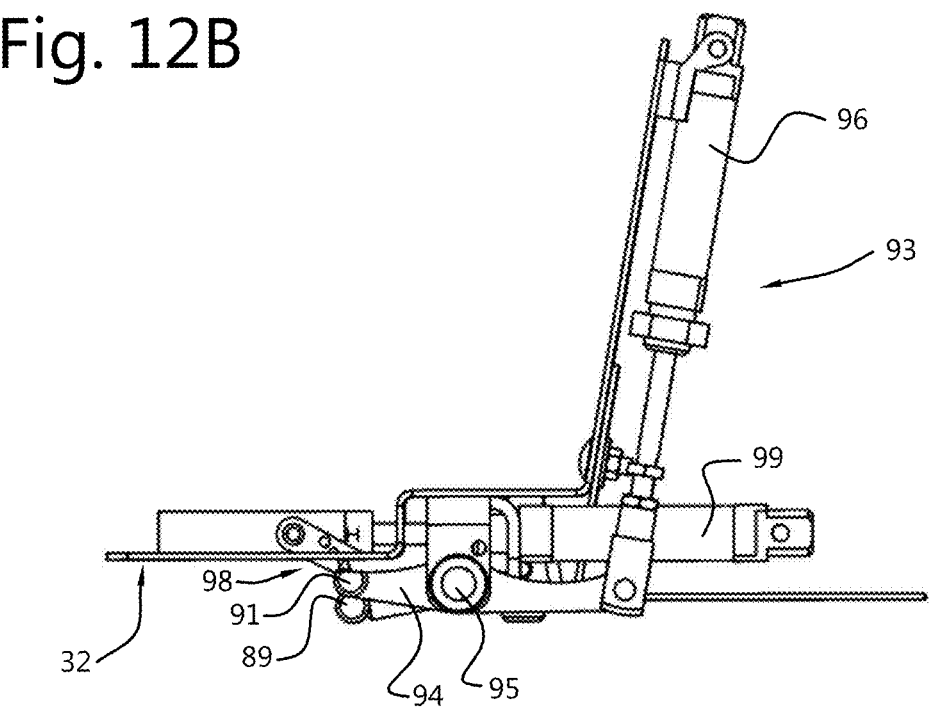

Each of the plurality of successive pressing units 90 has a pressing element 91 movable towards and from the positioning element 30 for pressing the spine portion 2 against the positioning element 30 by pressing against a body portion 7 underneath the transverse process 9 as FIG. 8 shows. Each pressing unit 90 also has a moving device 93 for moving the pressing element 91 from an inactive position (shown in FIG. 12a) in which it is free from the carcass part 3 in use, towards an active position (shown in FIG. 12b) in which the pressing element 91 is closer to the positioning element 30 compared to the inactive position and pushes against the carcass part 3, more specifically against the spinal body portion 7, for positioning the spine portion 2 against the positioning element 30. As FIGS. 12a and 12b show, the moving 93 device has a lever 94 pivotable about a pivot axis 95 for each pressing element 91. The lever 93 can be pivoted through suitable actuation of pneumatic actuator 96. The pivot axes 95 extend in the cutting direction 36. Each pressing element 91 has two knob shaped engagement elements 92, preferably a plurality of knob shaped engagement elements, engaging with the spine portion 2 in the active position of the pressing element 91.

The positioning device 126 further comprises a rod-shaped element 89 in a fixed position relative to the positioning element 30, wherein the rod-shaped element 89 extends in the cutting direction 36 in line with the successive pressing elements 91 at least in a position of the pressing elements 91 between the passive and the active position as FIGS. 12a and 12b show. During use, while cutting, a first part of the length of the spine portion 2, which may comprise lumbar vertebrae, is pressed against the positioning element 30 by the plurality of pressing elements 91 and a second, remaining part of the length of the spine portion 2 lies against the rod-shaped element 89 as shown in FIG. 2.

In order to even more robustly position the spine portion 2 against the positioning element 30, the positioning device 26 has a plurality of gripping elements 98, each protruding from the positioning element 30 and configured to engage the spine portion and depending on an accuracy of the cut made by the splitting, into a split neural canal 10 of the spine portion 2. Each of the plurality of pressing units 90 has an associated gripping element 98, which, as shown in FIGS. 12a and 12b, is pivotable between a rest position (FIG. 12a, FIG. 6) and a gripping position (FIG. 12b, FIG. 7, FIG. 11), in the latter position protruding from the positioning element 30. The gripping element 98 is configured to be moved between said rest position and gripping position by means of a pneumatic cylinder 99. In the present example, two pairs of grippers 98 are provided, each pair being movable by a cylinder 99.

As will already be clear from the above description of the spine processing device 1, a method for loosening meat, preferably loin meat, from a spine portion 2 of a split carcass part 3 of a four-legged slaughter animal, such as a pork carcass part, comprises:

positioning the carcass part using the positioning device 26. The carcass part 3, with a cut surface 5 thereof, may be brought into contact with a positioning element 30 that defines a positioning plane 32 for the cut surface 5;

pressing the spine portion 2 against the positioning element 30 using the pressing device 34;

loosening the meat, by cutting using the cutting device 28, from the spinous process parts 6 and from the articular processes 8, in the cutting direction 36 in use parallel to a length direction 38 of the spine portion 2.

The cutting comprises:

cutting along the spinous process parts 6 using the first cutter 40;

cutting along an outer side 8a of the articular processes 8 using the second cutter 60 which is movable in the transverse direction 62 transverse to the cutting direction 36 relative to the first cutter 40;

cutting along an upper, dorsal side 8b of the articular processes 8 using a third cutter 80 provided in between the first cutter 40 and the second cutter 60;

the first, second and third cutter jointly moving relative to the carcass part 3 during cutting, and urging the second cutter 60 towards the first cutter 40 in the transverse direction 62 during cutting, such that the second cutter 60 cuts along the outer side 8a of the articular processes 8, using the urging element 69. The second cutter 60 may cut at a predetermined distance from, or directly along, the outer side 8a of the articular processes 8.

The invention claimed is:

1. A spine processing device, for loosening meat, from a spine portion of a split carcass part of a four-legged slaughter animal, the spine portion including split vertebrae with respective spinous process parts, spinal body parts, articular processes and transverse processes, the spine processing device comprising:

a positioning device for positioning the carcass part;

a cutting device for loosening the meat, by cutting, from the spinous process parts and from the articular processes, in a cutting direction parallel to a length direction of the spine portion, the cutting device comprising:

a first cutter configured for cutting along the spinous process parts;
a second cutter configured for cutting along an outer side of the articular processes;
a third cutter in between the first cutter and the second cutter, for cutting along an upper, dorsal side of the articular processes;
wherein the first, second and third cutters are mutually connected for joint movement relative to the carcass part,
wherein the second cutter is movable in a transverse direction transverse to the cutting direction, relative to the first cutter,
the cutting device further having an urging element for urging the second cutter towards the first cutter in the transverse direction during use while cutting, such that the second cutter cuts along the outer side of the articular processes.

2. The spine processing device according to claim 1, wherein the second cutter is pivotable relative to the first cutter about a pivot axis extending perpendicular to the cutting direction and to the transverse direction,
wherein the second cutter is provided at a free end of a pivot arm pivotally connected to the first cutter about the pivot axis.

3. The spine processing device according to claim 1, wherein the second cutter has a blade portion with a cutting edge on a forward facing side of the blade portion, the blade portion being designed such that it extends along a plurality of successive articular processes in the cutting direction,
wherein the blade portion is positioned to be urged towards the outer side of the articular processes by the urging element.

4. The spine processing device according to claim 3, wherein the cutting edge of the second cutter is at least substantially parallel to a cutting edge of the first cutter, seen in the cutting direction.

5. The spine processing device according claim 1, wherein a blade portion of the second cutter is pivotable relative to the first cutter about a further pivot axis extending in the transverse direction and
wherein the cutting device has a further urging element for urging a cutting edge of the second cutter towards the transverse processes in use, in a direction perpendicular to the cutting direction and to the transverse direction.

6. The spine processing device according to claim 1, wherein the third cutter has a cutting edge on a forward side and a guide portion past the cutting edge, the guide portion being designed such that it extends over a plurality of successive articular processes in the cutting direction.

7. The spine processing device according to claim 1, wherein the third cutter has a fixed part fixated to the first cutter, and has a movable part fixated to the second cutter, so that in use the movable part moves relative to the first cutter jointly with the second cutter.

8. The spine processing device according to claim 7, wherein the fixed part and the movable part have overlapping respective cutting edges configured such that in use, upon movement of the second cutter relative to the first cutter, said respective cutting edges remain in an overlapping arrangement with respect to each other.

9. The spine processing device according to claim 8, wherein the cutting edge of the movable part is a continuation of the cutting edge of the fixed part.

10. The spine processing device according to claim 1, wherein:
the positioning device is configured to position the carcass part with a cut surface of the spine portion in a positioning plane;
the cutting direction is parallel to the positioning plane;
a cutting edge of the first cutter extends in a first plane parallel to the positioning plane; and
a cutting edge of the second cutter extends in a second plane parallel to the positioning plane.

11. The spine processing device according to claim 1, wherein, in use, the carcass part is suspended from a carrier connected to and moved by an overhang transport system arranged for conveying the carcass part along a transport trajectory past the spine processing device, the spine processing device comprising a moving device for moving the spine processing device over a predetermined distance along the conveying trajectory, at least during the loosening of the meat from the spine portion.

12. A spine processing system, for loosening meat, from a spine portion of a split carcass part of a four-legged slaughter animal, the spine processing system comprising:
an overhang transport system having a plurality of carriers for transporting the split carcass part along a transport trajectory, each of the plurality of carriers arranged for suspending a carcass part therefrom;
a spine processing device according to claim 1, provided along the transport trajectory.

13. The spine processing system according to claim 12, wherein the spine processing device comprising a moving device for moving the spine processing device over a predetermined distance along the conveying trajectory, at least during the loosening of the meat from the spine portion.

14. A method for loosening meat, from a spine portion of a split carcass part of a four-legged slaughter animal, the spine portion including split vertebrae with respective spinous process parts, spinal body portions, articular processes and transverse processes,
the method comprising:
positioning the carcass part;
loosening the meat, by cutting using a cutting device, from the spinous process parts and from the articular processes, in a cutting direction in use parallel to a length direction of the spine portion,
the cutting comprising:
cutting along the spinous process parts using a first cutter of the cutting device;
cutting along an outer side of the articular processes using a second cutter of the cutting device, wherein the second cutter is movable in a transverse direction transverse to the cutting direction relative to the first cutter;
cutting along an upper, dorsal side of the articular processes using a third cutter of the cutting device in between the first cutter and the second cutter;
the first, second and third cutter jointly moving relative to the carcass part during cutting, and
urging the second cutter towards the first cutter in the transverse direction during cutting, such that the second cutter cuts along the outer side of the articular processes, using an urging element of the cutting device.

15. The method according to claim 14, using a device a spine processing device, for loosening meat, from a spine portion of a split carcass part of a four-legged slaughter animal, the spine portion including split vertebrae with respective spinous process parts, spinal body parts, articular processes and transverse processes,
the spine processing device comprising:
a positioning device for positioning the carcass part;

a cutting device for loosening the meat, by cutting, from the spinous process parts and from the articular processes, in a cutting direction parallel to a length direction of the spine portion, the cutting device comprising:

a first cutter configured for cutting along the spinous process parts;

a second cutter configured for cutting along an outer side of the articular processes;

a third cutter in between the first cutter and the second cutter, for cutting along an upper, dorsal side of the articular processes;

wherein the first, second and third cutters are mutually connected for joint movement relative to the carcass part, wherein the second cutter is movable in a transverse direction transverse to the cutting direction, relative to the first cutter, the cutting device further having an urging element for urging the second cutter towards the first cutter in the transverse direction during use while cutting, such that the second cutter cuts along the outer side of the articular processes.

16. The method according to claim 14, using a spine processing system, for loosening meat, from a spine portion of a split carcass part of a four-legged slaughter animal, the spine processing system comprising:

an overhang transport system having a plurality of carriers for transporting the split carcass part along a transport trajectory, each of the plurality of carriers arranged for suspending a carcass part therefrom;

a spine processing device, provided along the transport trajectory.

* * * * *